United States Patent
Pollmeyer et al.

(10) Patent No.: US 8,523,209 B2
(45) Date of Patent: Sep. 3, 2013

(54) SEMI-TRAILING ARM AXLE FOR A MOTOR VEHICLE

(75) Inventors: Stephan Pollmeyer, Freidrichshafen (DE); Volker Wagner, Ravensburg (DE); Gabriele Fruhmann, Bregenz (AT)

(73) Assignee: ZF Friedrichshafen AG, Friedrichshafen (DE)

( * ) Notice: Subject to any disclaimer, the term of this patent is extended or adjusted under 35 U.S.C. 154(b) by 106 days.

(21) Appl. No.: 13/131,177

(22) PCT Filed: Dec. 9, 2009

(86) PCT No.: PCT/EP2009/066661
§ 371 (c)(1),
(2), (4) Date: May 25, 2011

(87) PCT Pub. No.: WO2010/072564
PCT Pub. Date: Jul. 1, 2010

(65) Prior Publication Data
US 2011/0227310 A1    Sep. 22, 2011

(30) Foreign Application Priority Data
Dec. 15, 2008    (DE) .......................... 10 2008 054 670

(51) Int. Cl.
*B60G 3/12*    (2006.01)
*B60G 3/18*    (2006.01)
*B60G 7/00*    (2006.01)
*B62D 17/00*    (2006.01)

(52) U.S. Cl.
USPC ............ 280/124.128; 280/86.75; 280/86.758; 280/124.134; 280/124.153

(58) Field of Classification Search
USPC ............ 280/86.75, 86.754, 86.757, 124.106, 280/124.11, 124.117, 124.128, 124.131, 280/124.132, 124.134, 124.145, 124.152, 280/124.153, 93.51, 93.512, 86.758
See application file for complete search history.

(56) References Cited

U.S. PATENT DOCUMENTS

| | | | | |
|---|---|---|---|---|
| 2,121,806 A | * | 6/1938 | Leighton | 280/124.134 |
| 2,153,168 A | * | 4/1939 | Broadman | 280/124.134 |
| 2,707,100 A | * | 4/1955 | Schilberg | 267/254 |
| 3,246,717 A | * | 4/1966 | Dreisziger | 180/359 |

(Continued)

FOREIGN PATENT DOCUMENTS

| | | |
|---|---|---|
| DE | 1 957 145 | 6/1970 |
| DE | 35 30 353 A1 | 3/1987 |

(Continued)

OTHER PUBLICATIONS

First Chinese Office Action issued Mar. 5, 2013 in corresponding Chinese application.

*Primary Examiner* — Joseph Rocca
*Assistant Examiner* — Laura Freedman
(74) *Attorney, Agent, or Firm* — Davis & Bujold, PLLC

(57) ABSTRACT

A semi-trailing arm axle for a motor vehicle which comprises a semi-trailing arm (1) for each wheel (4) of the axle. Each semi-trailing arm (1) is flexible about the vertical axis and is mounted to the body or on a support frame by at least one mounting (2, 3). Each wheel (4) of the axle is connected to its respective flexible semi-trailing arm (1) by way of at least one wheel bearing (5), and the flexible semi-trailing arm (1) is the sole wheel-guiding element.

16 Claims, 2 Drawing Sheets

(56) References Cited

U.S. PATENT DOCUMENTS

| | | | | |
|---|---|---|---|---|
| 3,419,100 | A * | 12/1968 | Enke | 180/360 |
| 3,693,746 | A | 9/1972 | Yamamoto | |
| 3,883,152 | A * | 5/1975 | De Carbon | 280/124.138 |
| 3,892,284 | A * | 7/1975 | Braess et al. | 280/124.15 |
| 3,893,701 | A * | 7/1975 | Kroniger | 280/124.131 |
| 4,203,615 | A * | 5/1980 | Cislo et al. | 280/124.106 |
| 4,261,591 | A * | 4/1981 | Warne, Jr. | 280/124.13 |
| 4,491,341 | A * | 1/1985 | Maebayashi | 280/124.128 |
| 4,509,774 | A * | 4/1985 | Booher | 280/124.134 |
| 4,526,400 | A * | 7/1985 | Kijima et al. | 280/124.128 |
| 4,537,420 | A * | 8/1985 | Ito et al. | 280/86.75 |
| 4,772,043 | A * | 9/1988 | Muramatsu | 280/124.144 |
| 5,156,414 | A * | 10/1992 | Fayard et al. | 280/86.75 |
| 5,267,751 | A | 12/1993 | Hiromoto et al. | |
| 5,829,764 | A | 11/1998 | Griffiths | |
| 6,241,262 | B1 * | 6/2001 | Suess | 280/5.522 |
| 6,250,660 | B1 * | 6/2001 | Woo | 280/124.149 |
| 6,860,499 | B2 | 3/2005 | Gerrard | |
| 7,125,028 | B2 * | 10/2006 | Ham | 280/124.134 |
| 7,201,388 | B2 * | 4/2007 | Abrat et al. | 280/124.128 |
| 7,980,576 | B2 * | 7/2011 | Inoue et al. | 280/124.121 |
| 7,997,598 | B2 * | 8/2011 | Ralph et al. | 280/124.116 |
| 8,070,993 | B2 * | 12/2011 | Keys | 264/40.4 |
| 2008/0111336 | A1 | 5/2008 | Aubarede et al. | |

FOREIGN PATENT DOCUMENTS

| | | |
|---|---|---|
| DE | 195 17 074 A1 | 11/1996 |
| EP | 83206 A2 * | 7/1983 |
| EP | 0 754 575 A2 | 1/1997 |
| EP | 1 288 028 A2 | 3/2003 |
| EP | 1 361 084 A2 | 11/2003 |
| EP | 1 831 037 | 9/2007 |
| FR | 1 451 022 | 7/1996 |
| GB | 1 315 272 | 5/1973 |
| JP | 58-191618 A | 11/1983 |
| WO | 2006/067087 A1 | 7/2006 |

* cited by examiner

SEMI-TRAILING ARM AXLE FOR A MOTOR VEHICLE

This application is a National Stage completion of PCT/EP2009/066661 filed Dec. 9, 2009, which claims priority from German patent application serial no. 10 2008 054 670.4 filed Dec. 15, 2008.

FIELD OF THE INVENTION

The present invention relates to a semi-trailing arm axle for a motor vehicle.

BACKGROUND OF THE INVENTION

From the prior art semi-trailing arm axles for motor vehicles are known. In these axles the wheel carrier is integrated in a solid semi-trailing arm, which in turn is, as a rule, mounted by means of two rubber mountings on the vehicle body or on a support frame so that it can rotate, whereas the wheels of the axle are mounted on the semi-trailing arm at least via the wheel bearings. By virtue of the sweepback and elevation angles, the tracking and camber variation can be adjusted by the spring deflection. Besides the semi-trailing arm, which serves as the sole wheel-guiding element, the semi-trailing arm axle has for each wheel a body spring usually in the form of a spiral spring and a vibration damper, which are respectively fixed on the semi-trailing arm. The semi-trailing arms can also be fixed on an auxiliary support frame, which constitutes the connecting element to the vehicle's body or its chassis.

For example, EP 0754575 B1 describes a semi-trailing arm suspension for connecting a vehicle wheel to the vehicle's body, such that the suspension comprises a wheel carrier for the rotatable support of the wheel, spring means for prestressing the wheel carrier in a downward direction relative to the body, and a linkage mechanism arrangement for controlling the movement of the wheel carrier relative to the vehicle body, wherein the hinge mechanism arrangement comprises a first control arm with an inwardly-directed end connected to part of the vehicle body so that it can rotate relative thereto about a generally horizontal rotation axis, and an outer end connected to the wheel carrier, such that in relation to the vehicle body the first control arm extends, from its inwardly-directed end to its outwardly-directed end, backward and outward.

The known semi-trailing arm suspension comprises a connection means with a second control arm having a first end connected to part of the vehicle body and able to rotate relative thereto about a generally horizontal axis, and a second end connected to the wheel carrier, such that the wheel carrier can rotate relative to the first control arm about a substantially vertical axis, and the connection means contains a further linkage mechanism which is connected at one point to part of the vehicle body, which, relative to the point where the second control arm is connected to the vehicle body, lies outside and to the rear of the imaginary line extending between the connection point of the first control arm to the body and the connection point of the second control arm to the body. In this case it is provided that the first control arm extends in a generally transverse direction, the second control arm is positioned ahead of the first control arm, and the first and second control arms converge in such manner that they intersect at a point on imaginary lines passing through the connection points of the first and second control arms with the wheel carriers and the vehicle body outside the center of the wheel and to the rear of the wheel's rotational axis, so that the further linkage mechanism tends to cause the wheel carrier to rotate relative to the vehicle body about the substantially vertical axis as a reaction to vertical movement of the wheel. Preferably, the further linkage mechanism is connected to the wheel carrier by the second control arm.

Furthermore, from EP 1288028 A2 an individual wheel suspension of a semi-trailing arm axle with at least two degrees of freedom is known, which comprises at least two flexible control arms connected to the respective wheel carriers and the body, such that owing to their flexible design and geometry the control arms enable a third degree of freedom of the individual wheel suspension about an axis of predetermined orientation, the axis being defined by the intersection of the planes of the two control arms.

EP 1831037 A1 describes a spring mounted axle for a vehicle, that comprises for each wheel a control arm which is connected to the body of the vehicle and enables a spring deflection of the wheel, and a transversely arranged torsion element such that each end of the torsion element is connected rigidly to the control arm associated with the respective wheel in order to form in each case a rigid part of the axle, the two rigid parts of the axle are connected to one another by a torsional component and the wheel carriers are connected by a first and second control arm each to a respective rigid part of the axle. In this case, by virtue of the articulated connections between the wheel carriers and the first and second control arms and between the first and second control arms and the rigid parts of the axle, substantially perpendicular axes are defined.

SUMMARY OF THE INVENTION

The purpose of the present invention is to disclose a semi-trailing arm axle for a motor vehicle, by using which, in contrast to a conventional semi-trailing arm axle, moving with toe-out under the effect of lateral and braking forces is avoided. In addition the effect achieved should be that under lateral and braking forces the wheels of the axle move with toe-in, which results in understeering or neutral driving behavior.

Accordingly a semi-trailing arm axle for a motor vehicle is proposed, which instead of a rigid control arm for each wheel of the axle, has a control arm which is flexible about the vertical axis and which is responsible for wheel guiding. The flexible semi-trailing arm is mounted on the body or on a support frame by at least one mounting, preferably in the form of a rubber mounting, and each wheel of the axle is connected to the flexible semi-trailing arm by at least one wheel bearing, so that the flexible semi-trailing arm is the sole wheel-guiding element. This makes it possible for a wheel to have a single tire or more than one tire arranged directly adjacent to one another, as for example in the case of twin tires.

According to the invention the flexible semi-trailing arm can particularly advantageously be in the form of a sheet component or a fiber composite component, since such components can be shaped effectively, allowing their rigidity to be controlled very well.

The flexible semi-trailing arm has a virtual pivoting point, which in the event of lateral and braking forces ensures toe-in running of the wheel concerned, whereby oversteering of the vehicle due to lateral force is advantageously prevented. In the presence of lateral forces it is particularly advantageous for this virtual pivoting point to be behind the point of application of the lateral force in the forward driving direction; furthermore, the virtual pivoting point can be outside the braking force application point in the direction transverse to the vehicle, which influences the tracking positively under braking forces.

BRIEF DESCRIPTION OF THE DRAWINGS

Below, an example of the invention is explained in more detail with reference to the attached figures, which show.

DETAILED DESCRIPTION OF THE PREFERRED EMBODIMENTS

Figure 1:
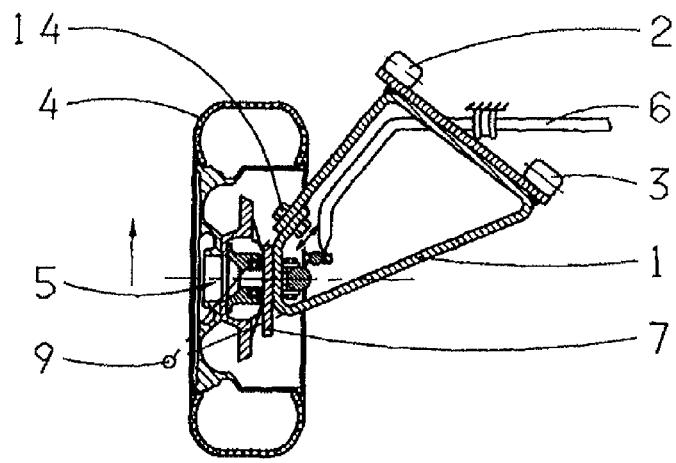
FIG. 1: Schematic plan view of the wheel suspension of a semi-trailing arm axle according to the invention.
Figure 2:
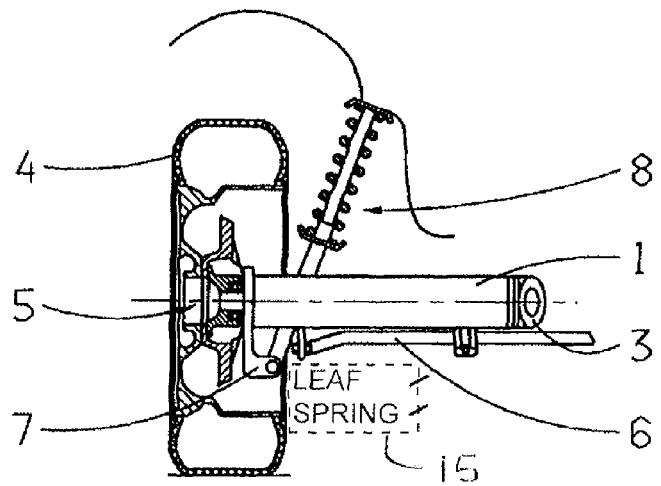
FIG. 2: Schematic rear view of the wheel suspension of a semi-trailing arm axle according to the invention.

According to the invention, and referring to FIGS. 1 and 2, instead of a rigid control arm for every wheel 4 of the axle, the axle according to the invention comprises a semi-trailing arm 1 flexible about the vertical axis, which is the wheel-guiding element and which is mounted on the vehicle body or on a support frame by means of two mountings 2, 3 preferably in the form of rubber mountings.

As can be seen from FIGS. 1 and 2, each wheel 4 is connected via a wheel bearing 5 and a wheel carrier 7 to its respective flexible semi-trailing arm 1, so that the flexible semi-trailing arm 1 is the sole wheel-guiding element. The virtual pivoting point of the flexible semi-trailing arm 1 is shown in FIG. 1, indexed 9; furthermore, indexed 6 in FIGS. 1 and 2 is a stabilizer known per se, which can in particular be connected to a damper, to the wheel carrier 7 or, as shown, to the flexible semi-trailing arm 1. In FIG. 1 the forward driving direction is indicated by the upward arrow on the left. In the design version of the invention shown in FIG. 1 the flexible semi-trailing arm 1 is made integrally, its ends in contact with one another being bolted together. At least one of the connecting bolts 14 has an eccentric, which allows the ends to be displaced relative to one another along the double arrow, whereby the track of the semi-trailing arm 1 can be adjusted in a simple manner.

As shown in FIG. 2, for each wheel suspension the axle according to the invention comprises a spring damper unit 8 connected to the wheel carrier 7, which serves to ensure spring deflection and damping of the body. In this context, the spring damper unit 8 can be understood to be a separate arrangement comprising at least one spring and a damper, which form a functional unit for springing and damping the body. In an embodiment of the invention not illustrated here, the spring damper unit 8 can also be attached to the flexible semi-trailing arm 1. However, for the springing and damping of the body it is also possible to provide at least one transverse leaf spring 15 and for each wheel suspension at least one damper, which can in each case be connected to the wheel carrier 7 or to the flexible semi-trailing arm 1. Transverse leaf springs 15 have advantages in relation to function integration, since a body suspension, a control arm and/or a stabilizer can be combined in a transverse leaf spring 15 in a simple manner.

Figure 3:
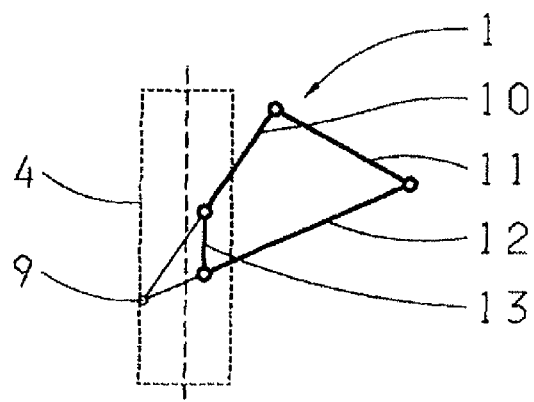
FIG. 3: Diagram equivalent to the wheel suspension of a semi-trailing arm axle according to the invention.

As shown in FIG. 3, the flexibly constructed semi-trailing arm 1 is particularly preferably formed, in the manner of a linkage, essentially of four members 10, 11, 12, 13 that form a quadrilateral in one plane, these being coupled to one another at coupling points. The semi-trailing arm 1 is attached by means of the first member 11 to the body or to a support frame, and by means of the second member 13 to the wheel 4. The first and second members 11 and 13 are connected to one another by the other members 10 and 12, whereas the coupling points of the flexible semi-trailing arm 1 that hold the members 10, 11, 12, 13 together and are here represented as hinges, have selectively chosen rigidities in order to produce the flexibility of the semi-trailing arm 1 required according to the invention.

In this case the first member 11 is attached by at least one mounting, preferably in the form of a rubber mounting, to the body or to a support frame, whereas the second member 13 connects the semi-trailing arm 1, via at least one wheel bearing (not shown here), to the wheel 4. The position of the virtual pivoting point 9 is defined by the intersection of two lines respectively extending through the two coupling points of one of the other members 10, 12 with the first and second member 11, 13. The position of the virtual pivoting point 9, determined by the configuration of the flexible semi-trailing arm 1, together with the rigidity of the coupling points of the flexible semi-trailing arm 1, determines the amount of the toe-in variation produced by a given lateral or braking force.

Like the coupling points that link the members 10, 11, 12, 13, so too the members 10, 11, 12, 13 themselves can be given selectively chosen rigidities in order to produce the flexibility of the semi-trailing arm 1 required according to the invention. The rigidities can be produced both by the material and by the shaping of the members 10, 11, 12, 13 and their coupling points. In particular, for the reasons already mentioned members 10, 11, 12, 13 made as sheet components or fiber composite components are very suitable.

As shown in FIG. 1, the members 10, 11, 12, 13 and their coupling points can form an integral semi-trailing arm 1, and the members 10, 11, 12, 13 and the coupling points are then individual sections of the semi-trailing arm 1. Thus, a member 10, 11, 12, 13 or a coupling point of the semi-trailing arm 1 is not always to be understood to be exclusively a single component, and in particular the first or the second member 11, 13 with one or both of the other members 10, 12 and the corresponding coupling points can form an integral component of the semi-trailing arm 1.

The position of the virtual pivoting point 9 according to the invention, namely behind the point of action of a lateral force and/or outside a braking force point of action, ensures that, in the event of lateral or braking forces, the wheel 4 concerned will run with toe-in, whereby oversteering of the vehicle due to the lateral force is advantageously prevented and the tracking, under braking forces, is influenced positively.

Figure 4:
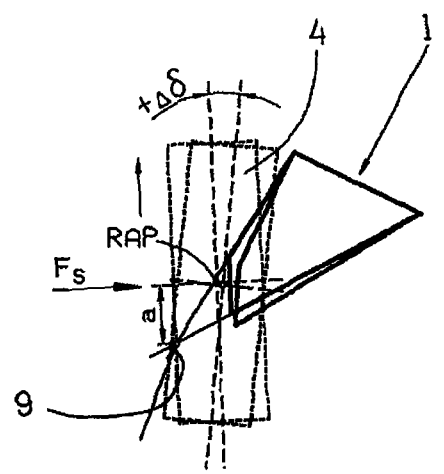
FIG. 4: Schematic representation of the tracking variation of the wheel suspension of a semi-trailing arm axle according to the invention under the effect of a lateral force.

The tracking variation due to a lateral force is illustrated in FIG. 4, in which the lateral force is indexed $F_S$ and the track variation is shown as $\Delta\delta$; the wheel contact point, at which the lateral force is exerted, is denoted RAP. As can be seen from FIG. 4 the flexible semi-trailing arm 1 is so designed that in the forward driving direction, which is indicated by the upward arrow, the virtual pivoting point 9 is behind the lateral force application point. This deviation along the forward driving direction between the lateral force application and the virtual pivoting point 9 is indexed a.

Figure 5:
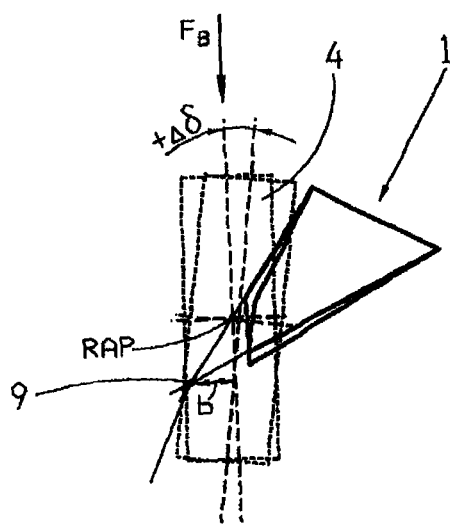
FIG. 5: Schematic representation of the tracking variation of the wheel suspension of a semi-trailing arm axle according to the invention under the effect of a braking force.

According to the invention, the flexible semi-trailing arm 1 is also designed such that the virtual pivoting point 9 is located outside the braking force application point in the transverse direction of the vehicle, toward the side of the wheel 4 facing away from the semi-trailing arm 1, which influences the tracking positively when braking forces are present. This is illustrated with reference to FIG. 5, in which the braking force is denoted by $F_B$ and the track variation by $\Delta\delta$; the braking force is again applied at the wheel contact point denoted as RAP. In FIG. 5 the deviation of the virtual pivoting point 9 from the braking force application point in the direction transverse to the vehicle is denoted b.

A further advantage of the invention is that a flat-shaped axle design is produced, since the spring damper unit 8 is not involved in wheel guiding and an upper control arm plane, of the type known from sword-arm or dual transverse control arm axles, is omitted.

INDEXES

1 Flexible semi-trailing arm
2 Mounting
3 Mounting
4 Wheel
5 Wheel bearing
6 Stabilizer
7 Wheel carrier
8 Spring damper unit
9 Virtual pivoting point
10 First member of the flexible semi-trailing arm 1
11 Further member of the flexible semi-trailing arm 1
12 Further member of the flexible semi-trailing arm 1
13 Second member of the flexible semi-trailing arm 1
14 Connecting bolt
RAP Wheel ground-contact point
$\Delta\delta$ Track change
$F_S$ Lateral force
$F_B$ Braking force
a Deviation of the virtual pivoting point 9 from the lateral force application point along the forward driving direction
b Deviation of the virtual pivoting point 9 from the braking force application point along the direction transverse to the vehicle

The invention claimed is:

1. A semi-trailing arm axle for a motor vehicle, the semi-trailing arm axle comprising:
    at least one wheel (4) being supported by a semi-trailing arm (1);
    the semi-trailing arm (1) being formed as a quadrilateral, the semi-trailing arm (1) lying in a horizontal plane and being mounted on one of a body and a support frame by at least one mounting (2, 3),
    the semi-trailing arm (1) being flexible about a vertical axis;
    at least one wheel bearing (5), connecting each wheel (4) to the flexible semi-trailing arm (1), facilitates rotation of the wheel, and
    the flexible semi-trailing arm (1) being a sole wheel tracking element that controls wheel toe for each wheel (4) supported by the flexible semi-trailing arm (1).

2. The semi-trailing arm axle for the motor vehicle according to claim 1, wherein a virtual pivoting point (9) of the semi-trailing arm (1) is positioned behind a lateral force application point in relation to a forward driving direction of the vehicle.

3. The semi-trailing arm axle for the motor vehicle according to claim 1, wherein the semi-trailing arm (1) is manufactured from one of sheet metal component and a fiber composite component.

4. The semi-trailing arm axle for the motor vehicle according to claim 1, wherein a spring damper unit (8) is provided for each wheel suspension and the spring damper unit (8) extends normal to the horizontal plane defined by the semi-trailing arm (1).

5. The semi-trailing arm axle for the motor vehicle according to claim 4, wherein the spring damper unit (8) is attached to one of the semi-trailing arm (1) and a wheel carrier (7).

6. The semi-trailing arm axle for the motor vehicle according to claim 1, wherein at least one transverse leaf spring is connected to one of the semi-trailing arm (1) and a wheel carrier (7), and for each wheel suspension at least one damper, connected to one of the flexible semi-trailing arm (1) and a wheel carrier (7), is provided.

7. The semi-trailing arm axle for the motor vehicle according to claim 1, wherein the semi-trailing arm (1) is made integrally as a unitary construction, and ends of the semi-trailing arm (1) are bolted to one another by connecting bolts, and at least one of the connecting bolts (14) is an eccentric bolt for adjusting a track of the semi-trailing arm (1).

8. The semi-trailing arm axle for the motor vehicle according to claim 1, wherein a stabilizer (6) is connected to one of a damper of the semi-trailing arm axle, the flexible semi-trailing arm (1) and a wheel carrier (7).

9. The semi-trailing arm axle for the motor vehicle according to claim 1, wherein both an interior perimeter of the semi-trailing arm (1) and an exterior perimeter of the semi-trailing arm (1) define a quadrilateral.

10. The semi-trailing arm axle for the motor vehicle according to claim 1, wherein a third member (10) connects first ends of a first member (11) and a second member (13) with one another, a fourth member (12) connects second ends of the first member (11) and the second member (13) with one another to form the quadrilateral semi-trailing arm (1) such that the third and the fourth members (10, 12) space the first and the second members (11, 13) from one another and the first and the second members (11, 13) space the third and the fourth members (10, 12) from one another.

11. The semi-trailing arm axle for the motor vehicle according to claim 1, wherein a first member (11) is attached, by the at least one mounting, to one of the body and the support frame,
    a second member (13) connects the semi-trailing arm (1), via the at least one wheel bearing, to the wheel (4),
    a third member (10) connects first ends of the first and the second members (11, 13) with one another, a fourth member (12) connects second ends of the first and the second members (11, 13) with one another such that the third and the fourth members (10, 12) space the first and the second members (11, 13) from one another and form the quadrilateral semi-trailing arm (1).

12. The semi-trailing arm axle for the motor vehicle according to claim 1, wherein when the semi-trailing arm (1) is temporarily distorted along a horizontal plane, the quadrilateral semi-trailing arm (1) flexes about the vertical axis.

13. A semi-trailing arm axle for a motor vehicle, the semi-trailing arm axle comprising:
    at least one wheel (4) being supported by a semi-trailing arm (1);
    the semi-trailing arm (1) being mounted on one of a body and a support frame by at least one mounting (2, 3);
    at least one wheel bearing (5) connecting each wheel (4) to the semi-trailing arm (1); and
    the semi-trailing arm (1) being a sole element that controls wheel tracking for each wheel (4) supported by the semi-trailing arm (1);
    wherein the semi-trailing arm (1) comprises first, second, third and fourth members (10, 11, 12, 13) that form a quadrilateral which lies in a substantially horizontal plane, the first, the second, the third and the fourth members (10, 11, 12, 13) are coupled at coupling points, the coupling points have selectively chosen rigidities such that the first member (11) is attached by at least one mounting to one of the body and the support frame, the second member (13) is connected, via the at least one wheel bearing (5), to the wheel (4), and the first and the second members (11, 13) are connected to one another by the third and the fourth members (10, 12).

14. The semi-trailing arm axle for the motor vehicle according to claim 13, wherein a virtual pivoting point (9) of the semi-trailing arm (1) is positioned behind a lateral force application point in relation to a forward driving direction of the vehicle.

15. The semi-trailing arm axle for the motor vehicle according to claim 13, wherein a virtual pivoting point (9) of the semi-trailing arm (1) is located outside a braking force application point in relation to a transverse direction of the vehicle.

16. A semi-trailing arm axle for a motor vehicle, the semi-trailing arm axle comprises a semi-trailing arm (1) supporting a wheel (4), via a wheel carrier (7) and a wheel bearing (5),
the semi-trailing arm (1) being flexible about a vertical axis and being a lone wheel-tracking element,
the semi-trailing arm (1) comprising first, second, third and fourth members (11, 13, 10, 12), the first member (11) being coupled to either a body or a support frame of the vehicle by at least one mounting (2, 3) and the second member (13) being fixed to the wheel (4) via the wheel carrier (7) and the wheel bearing (5) such that the wheel is pivotable about a wheel contact point (RAP) in relation to a forward direction of travel, and the third and the fourth members (10, 12) are respectively coupled to the first and the second members (11, 13) at coupling points such that the first, the second, the third and the fourth members (11, 13, 10, 12) form a quadrilateral, the coupling points at which the third member (10) couples the first and the second members (11, 13) define leading axis and the coupling points at which the fourth member (12) couples the first and the second members (11, 13) defines a trailing axis, the leading axis and the trailing axis intersect at a virtual pivoting point (9) which is located behind the wheel contact point (RAP) in relation to the forward direction of travel and at a distance further from the semi-trailing arm (1) than the wheel contact point (RAP).

\* \* \* \* \*